US007916869B2

(12) United States Patent
Xu et al.

(10) Patent No.: US 7,916,869 B2
(45) Date of Patent: *Mar. 29, 2011

(54) SYSTEM AND METHOD FOR AUTOMATIC SETUP OF A NETWORK DEVICE WITH SECURE NETWORK TRANSMISSION OF SETUP PARAMETERS USING A STANDARD REMOTE CONTROL

(75) Inventors: Shugong Xu, Vancouver, WA (US); Richard T. Bennett, Vancouver, WA (US)

(73) Assignee: Sharp Laboratories of America, Inc., Camas, WA (US)

( * ) Notice: Subject to any disclaimer, the term of this patent is extended or adjusted under 35 U.S.C. 154(b) by 1063 days.

This patent is subject to a terminal disclaimer.

(21) Appl. No.: 11/217,945

(22) Filed: Sep. 1, 2005

(65) Prior Publication Data
US 2007/0050615 A1    Mar. 1, 2007

(51) Int. Cl.
H04L 9/12    (2006.01)
(52) U.S. Cl. .................. 380/262; 380/278; 713/171
(58) Field of Classification Search .................. None
See application file for complete search history.

(56) References Cited

U.S. PATENT DOCUMENTS

| | | | |
|---|---|---|---|
| 5,189,287 A | | 2/1993 | Parienti |
| 5,768,381 A | * | 6/1998 | Hawthorne .................. 380/284 |
| 5,982,520 A | | 11/1999 | Weiser et al. |
| 6,088,143 A | | 7/2000 | Bang |
| 6,219,164 B1 | | 4/2001 | Morgaine |
| 6,457,069 B1 | | 9/2002 | Stanley |
| 6,609,199 B1 | | 8/2003 | DeTreville |
| 6,928,295 B2 | * | 8/2005 | Olson et al. .................. 455/522 |
| 6,993,134 B1 | * | 1/2006 | Epstein .................. 380/262 |
| 7,325,134 B2 | * | 1/2008 | Fascenda .................. 713/169 |
| 2002/0023179 A1 | | 2/2002 | Stanley |

(Continued)

FOREIGN PATENT DOCUMENTS

BE    1013866    10/2002

(Continued)

OTHER PUBLICATIONS

Airlogic Co. Ltd., Korea, web page advertisement and specification sheet for Airmate Bluetooth USB Dongle with Flash Memory, Nov. 2003 (www.airlogic.co.kr).

(Continued)

*Primary Examiner* — William R Korzuch
*Assistant Examiner* — Michael R Vaughan
(74) *Attorney, Agent, or Firm* — Thomas R. Berthold

(57) ABSTRACT

A system and method allows a user to automatically configure a new device on a local area network (LAN) by pressing a sequence of buttons on a conventional remote control (RC) while pointing the infrared (IR) transmitter of the RC at the new device. The button-sequence includes an arbitrary button-sequence selected by the user, or a pre-established button-sequence stored in an existing network member device, such as the network controller, and displayed to the user. The button-sequence represents a cipher key for an encryption/decryption algorithm. The network member device uses the cipher key to encrypt a configuration message that includes a shared network security key and transmit it over the network. The encrypted configuration message is received by the new device and decrypted using the same cipher key. The decrypted network configuration parameters, including the shared network security key, enable the new device to automatically associate with the network and communicate in a secure manner using the shared network security key.

9 Claims, 3 Drawing Sheets

U.S. PATENT DOCUMENTS

| | | | |
|---|---|---|---|
| 2002/0048368 A1* | 4/2002 | Gardner | 380/277 |
| 2002/0077077 A1 | 6/2002 | Rezvani et al. | |
| 2002/0099665 A1 | 7/2002 | Burger | |
| 2002/0165006 A1* | 11/2002 | Haller et al. | 455/556 |
| 2002/0178370 A1* | 11/2002 | Gurevich et al. | 713/189 |
| 2003/0079000 A1* | 4/2003 | Chamberlain | 709/220 |
| 2003/0093663 A1* | 5/2003 | Walker | 713/150 |
| 2003/0158960 A1 | 8/2003 | Engberg | |
| 2003/0163622 A1 | 8/2003 | Moran | |
| 2003/0212802 A1 | 11/2003 | Rector | |
| 2004/0060977 A1* | 4/2004 | Proennecke | 235/375 |
| 2004/0076300 A1 | 4/2004 | Ishidoshiro | |
| 2004/0120297 A1 | 6/2004 | McDonnell | |
| 2004/0203590 A1 | 10/2004 | Shteyn | |
| 2005/0094201 A1* | 5/2005 | Gecht et al. | 358/1.15 |
| 2005/0135628 A1* | 6/2005 | Dacosta | 380/283 |
| 2005/0135811 A1* | 6/2005 | Lee et al. | 398/139 |
| 2006/0039339 A1* | 2/2006 | Cohen | 370/338 |
| 2006/0047960 A1* | 3/2006 | Ono et al. | 713/171 |
| 2006/0053276 A1* | 3/2006 | Lortz et al. | 713/2 |
| 2006/0112280 A1* | 5/2006 | Cohen et al. | 713/186 |
| 2006/0185013 A1* | 8/2006 | Oyama et al. | 726/21 |
| 2006/0251256 A1* | 11/2006 | Asokan et al. | 380/270 |
| 2006/0251258 A1* | 11/2006 | Lillie et al. | 380/270 |
| 2007/0003062 A1* | 1/2007 | Mizikovsky et al. | 380/270 |
| 2007/0025554 A1* | 2/2007 | Ong | 380/278 |
| 2007/0079113 A1* | 4/2007 | Kulkarni et al. | 713/150 |
| 2007/0160201 A1* | 7/2007 | Blom et al. | 380/30 |
| 2008/0080713 A1* | 4/2008 | Cho et al. | 380/273 |

FOREIGN PATENT DOCUMENTS

| | | |
|---|---|---|
| EP | 0268972 | 6/1998 |
| EP | 1024626 A1 | 8/2000 |
| FR | 2700033 | 7/1994 |
| GB | 2139047 A | 10/1984 |
| IE | 20000729 | 4/2001 |
| WO | WO9820684 A2 | 5/1998 |
| WO | WO 9843427 A1 * | 10/1998 |
| WO | WO0111878 A1 | 2/2001 |
| WO | WO2004089029 A1 | 10/2004 |

OTHER PUBLICATIONS

AirStation One-Touch Secure System (AOSS™) "A Description of WLAN Security Challenges and Potential Solutions", Buffalo Technology, Inc., Oct. 2004 (www.buffalotech.com).

* cited by examiner

SYSTEM AND METHOD FOR AUTOMATIC SETUP OF A NETWORK DEVICE WITH SECURE NETWORK TRANSMISSION OF SETUP PARAMETERS USING A STANDARD REMOTE CONTROL

BACKGROUND OF THE INVENTION

1. Field of the Invention

This invention relates generally to local area networks (LANs), and more particularly to a system and method for automatic configuration of a new device on a LAN by secure network transmission of configuration parameters, including a shared network security key.

2. Description of the Related Art

LANs are in widespread use in the home and office and are expanding to include the transfer of audio and video between consumer electronic (CE) devices. These LANs include wireless local area networks (WLANs), perhaps the most common of which is based on the well-known IEEE 802.11 or Wi-Fi standards. Other types of WLANs include ultrawideband (UWB) networks that have a fairly short range but very high throughput, and wireless personal area networks (WPANs), such as ZigBee™ and Bluetooth®. Another type of LAN, one that does not use wireless transmission, is a powerline communications (PLC) network that uses the existing electrical wiring in a home or single building, such as a PLC network based on the HomePlug™ standard.

LANs typically include a device that acts as a network controller to connect the network devices together. The network controller may also act as the network's arbitrator, negotiating when network devices can transmit. In an IEEE 802.11 compliant WLAN, the network controller is called the access point (AP). In a PLC network the network controller is called the central controller. In many LANs, there is a need to setup or configure new devices. For example, in an IEEE 802.11 compliant WLAN the configuration information may include a network name or service set identifier (SSID), a channel number, and an optional shared network security key that need to be set in the new device before it can begin to communicate with existing network devices. Typically this configuration information is entered manually into the new device by the user, such as by use of a keypad. For devices without keypads, such as many CE devices like digital televisions (TVs), the configuration process can be difficult and annoying for the user.

In WLANs there is also a desire for secure communication because the wireless transmissions extend beyond the immediate vicinity of the network devices. The shared network security key is stored in all devices that use the encryption method to communicate over the LAN, including the network controller. In some non-wireless LANs, such as PLC networks, secure communication is also desirable because multiple homes or buildings and multiple-residence buildings such as apartment buildings are usually served from a common transformer so that the physical PLC network extends beyond the boundaries of a single residence. Secure communication is especially important in these types of LANs that have CE devices, such as stereo receivers, digital video recorders (DVRs), digital TVs and audio-video (AV) servers, because copyrighted digital audio and video recordings are transmitted over the network.

Secure communication is typically established in these types of non-secure LANs by the use of a shared network security key that is input to a network device during its setup process. For example, in an IEEE 802.11 compliant WLAN, the optional shared network security key is based on either the Wired Equivalent Privacy (WEP) or Wi-Fi Protected Access (WPA) encryption standards. In a PLC network based on the HomePlug standard all new devices are shipped with a common publicly-available password that is used to generate a shared network key, but this results in a LAN with non-secure communication. To achieve a secure PLC network configuration, a unique network password must be selected and entered into each device. However, most users do not configure their devices with these security measures because of the inconvenience in configuring the devices with the security key. The user is required to manually enter complex security keys that typically consist of long strings of meaningless characters into multiple devices. The devices may be from various hardware vendors, each having different configuration steps and user interfaces.

Certain systems are commercially available that attempt to reduce the complexity of the configuration process for new LAN devices, and thus encourage the use of security. For example, IEEE 802.11 compliant devices that incorporate the AirStation OneTouch Secure System (AOSS™) from Buffalo Technology are shipped with a common pre-established WEP key and a special button. Activation of the button on the AP and the button on the new device causes the AP to pseudo-randomly generate a new shared network security key and puts the WLAN into a special low-power transmission mode where the AP and the new device can communicate using the common WEP key. The new shared network security key is then transmitted to the new device in the low-power transmission mode. The new device then uses the new shared network security key to communicate with the AP and receive the configuration information in the normal-power transmission mode. The AOSS requires that new devices be manufactured with the AOSS hardware and software, and installed with the common pre-established WEP key.

A method for setting up a new device on an IEEE 802.11 compliant WLAN using a "learning" type of remote control (RC) having both infrared (IR) transmit and receive capability is described in U.S. Published Patent Application US 2004/0203590 A1. In that method the AP and the new device are also equipped with IR transceivers. The RC is placed near the AP and the AP transmits the network WEP key currently in use to the RC via IR. The RC is then placed near the new device and transmits the WEP key to the new device via IR. Once the new device has the WEP key it can communicate with the AP and receive other setup parameters to authenticate and configure the new device. In this method the WEP key remains stored in the RC and is thus non-secure because the RC is a portable non-network device.

What is needed is a LAN with a simple yet secure setup method for new network devices that allows configuration information, including a shared network security key, to be easily and securely transmitted to a new device.

SUMMARY OF THE INVENTION

In the present invention the user automatically sets up a new device on the LAN by simply pressing a sequence of buttons on a standard or conventional remote control (RC) while pointing the IR transmitter of the RC at the new device. In one technique the network controller is placed in non-secure setup mode, such as by manually pressing a configuration (CFG) button, which causes the network controller to enter a setup mode, display the button-sequence to the user and transmit in a non-secure manner. The button-sequence displayed to the user is pre-established and stored in the network controller or generated by the network controller. The button-sequence represents a cipher key. The new device is also placed in non-secure setup mode, such as by pressing a configuration (CFG) button on the new device. This allows the new device to query the network controller for the setup service and receive non-secure setup or configuration parameters via non-secure communication. The new device is thus associated with the network, but communication is not encrypted and thus non-secure. The user then points the new device's RC at the new device and presses the button-sequence, the same button-sequence that was displayed by the network controller. The new device thus receives the cipher key outside the network ("out-of-band") via IR and stores the cipher key in its memory.

The network controller then transmits the secure setup or configuration information, including the shared network security key, encrypted with use of the cipher key. The new device receives the encrypted configuration information and recalls the previously-stored cipher key, using it as the decryption key to decrypt the configuration information. The new device stores the decrypted secure-mode configuration information, including the shared network security key, in nonvolatile memory. The network controller then exits the non-secure setup mode and resumes secure mode in which it uses the secure-mode configuration parameters, including the shared network security key, for network transmission. The new device also exits the setup-mode and joins the network, using the previously-stored secure configuration information.

In another technique the network controller is placed in non-secure setup mode, which causes the network controller to transmit in a non-secure manner, but no button-sequence is displayed. There is no pre-established cipher key and thus no pre-established button-sequence to be displayed by the network controller. Instead the user presses an arbitrary button-sequence on the network controller's RC to transmit the cipher key to the network controller via IR. If the network controller does not have an IR receiver, the cipher key can be input by use of a keypad or keyboard connected to the network controller. In either method of entry, the button-sequence is transmitted to the network controller out-of-band. The technique then proceeds as described above.

The new device is thus configured automatically, without the need for manual input of any network configuration parameters, and is now able to associate with the LAN in a secure manner as a new network member. The shared network security key, which has been transmitted with encryption and only within the LAN, and which now resides only in member devices, is used by the new device, thereby insuring that all future network transmissions are secure. Once the new member has been associated with the network, the cipher key is no longer needed and can be erased from memory in the member devices.

Thus secure automatic setup of a network device is accomplished with a conventional remote control. Only a relatively short sequence of numbers is required for the cipher key, or a password representing the cipher key, and in both techniques these numbers are short enough to be easy to remember. In the technique where the button-sequence is selected by the user it can be any easy-to-remember sequence, such as birth or anniversary date, zip code, or phone number. Since the cipher key is transmitted only via IR and not over the network, not stored in the RCs, and used only once for each new device, security of the cipher key can not be easily compromised.

The invention is applicable to LANS that have CE devices, such as stereo receivers, digital video recorders (DVRs), digital TVs and audio-video (AV) servers, where easy setup is important to the user and secure communication is desirable because copyrighted digital audio and video recordings are transmitted over the network.

For a fuller understanding of the nature and advantages of the present invention, reference should be made to the following detailed description taken together with the accompanying figures.

DETAILED DESCRIPTION OF THE INVENTION

Figure 1:
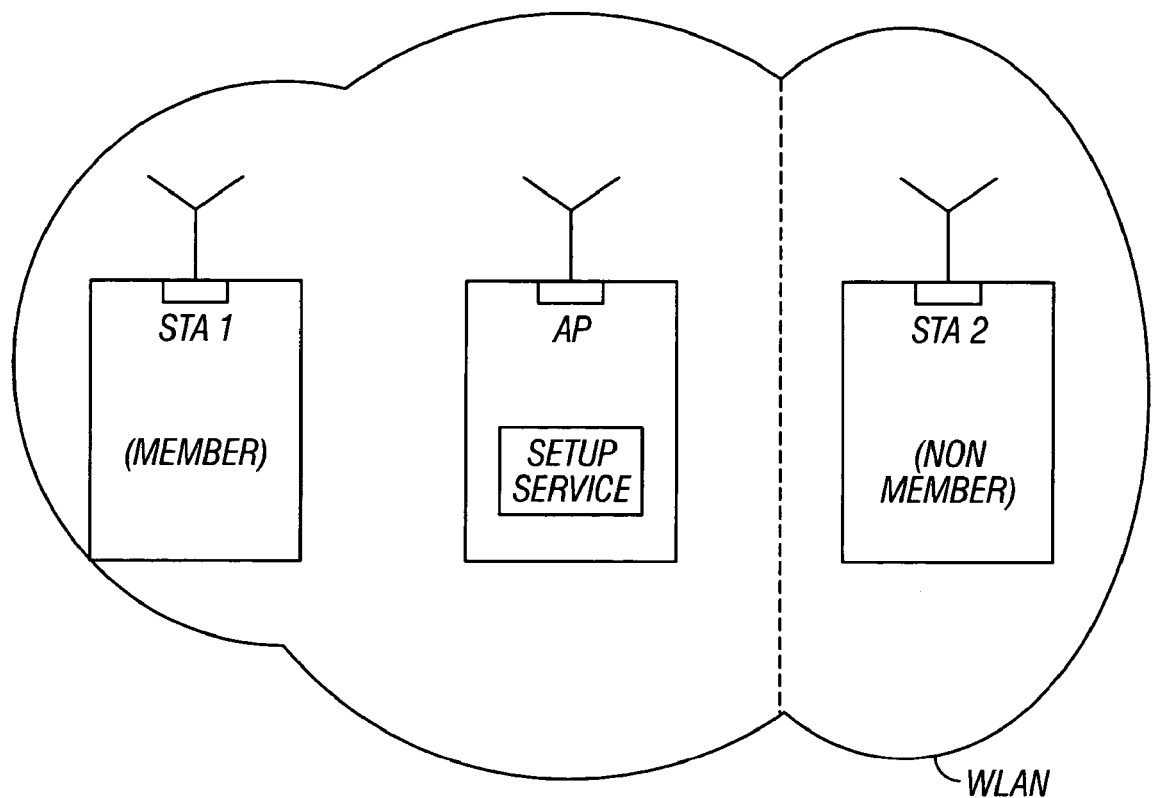
FIG. 1 is a block diagram of an IEEE 802.11 compliant WLAN for illustrating the prior art method of setting up or configuring a new device.

The invention will be described with respect to an IEEE 802.11 compliant WLAN, but the invention is fully applicable to other types of WLANs and to non-wireless LANs such as PLC networks. FIG. 1 is a high-level block diagram of an IEEE 802.11 compliant WLAN for illustrating the prior art method of setting up or configuring a new device. The WLAN Basic Service Set (BSS) includes the AP with the pre-installed setup service, a member device or station (STA 1) already connected and authenticated on the WLAN, and a nonmember device (STA 2) to be configured for connection to the WLAN and shown by the dashed line in FIG. 1 as not yet being part of the WLAN. Each of the AP, STA 1 and STA 2 devices is equipped with an IEEE 802.11 transceiver. The devices are typically personal computers (PCs), computer peripheral devices such as printers and storage devices, and consumer electronic (CE) devices such as stereo receivers, digital video recorders (DVRs) and digital TVs. One of the devices may also be an audio-video (AV) server, which is typically a PC, DVR or similar device with a hard disk drive (HDD) that stores the audio and/or video content.

To set up STA 2 for connection to the WLAN certain network configuration parameters that match the parameters in the AP setup service must be input to STA 2. For an IEEE 802.11 compliant WLAN these parameters would include the network name (SSID), the wireless channel number, the wireless mode (e.g., 802.11b, 802.11 g), a security option (e.g., WEP, WPA or none), and a shared network security key (e.g., a WEP key or WPA key) if a security option is selected. These parameters must be known by the user and then manually input to the new device (STA 2). The conventional manner for inputting these parameters is manually with a keyboard or keypad associated with the new device (STA 2). If the device is a CE device, like a digital TV, that does not have a keypad, the user may be required to use the device's remote control to manually enter parameters according to a written set of instructions shipped with the new device. Once these parameters have been input the new device can communicate with the AP and other member devices. If no security option has been selected, usually because the user is not motivated to manually enter a long string of mixed numbers and letters, then all wireless transmissions will be non-secure.

In the present invention the user automatically sets up a new device on the LAN by simply pressing a sequence of buttons on a standard or conventional remote control (RC) while pointing the IR transmitter of the RC at the new device.

In one technique the network controller is placed in non-secure setup mode, such as by manually pressing a configuration (CFG) button, which causes the network controller to enter a setup mode, display the button-sequence to the user and transmit in a non-secure manner. The button-sequence displayed to the user is pre-established and stored in the network controller or generated by the network controller. The button-sequence represents a cipher key. The new device is also placed in non-secure setup mode, such as by pressing a configuration (CFG) button on the new device. This allows the new device to query the network controller for the setup service and receive non-secure setup or configuration parameters via non-secure communication. The new device is thus associated with the network, but communication is not encrypted and thus non-secure. The user then points the new device's RC at the new device and presses the button-sequence, the same button-sequence that was displayed by the network controller. The new device thus receives the cipher key outside the network ("out-of-band") via IR and stores the cipher key in its memory.

The network controller then transmits the secure setup or configuration information, including the shared network security key, encrypted with use of the cipher key. The new device receives the encrypted configuration information and recalls the previously-stored cipher key, using it as the decryption key to decrypt the configuration information. The new device stores the decrypted secure-mode configuration information, including the shared network security key, in nonvolatile memory. The network controller then exits the non-secure setup mode and resumes secure mode in which it uses the secure-mode configuration parameters, including the shared network security key, for network transmission. The new device also exits the setup-mode and joins the network, using the previously-stored secure configuration information.

In another technique the network controller is placed in non-secure setup mode, which causes the network controller to transmit in a non-secure manner, but no button-sequence is displayed. There is no pre-established cipher key and thus no pre-established button-sequence to be displayed by the network controller. Instead the user presses an arbitrary button-sequence on the network controller's RC to transmit the cipher key to the network controller via IR. If the network controller does not have an IR receiver, the cipher key can be input by use of a keypad or keyboard connected to the network controller. In either method of entry, the button-sequence is transmitted to the network controller out-of-band. The technique then proceeds as described above.

In either of the above techniques, either or both the network controller and the new device can be placed in non-secure setup or configuration mode by pressing a designated setup button on the associated RC instead of pressing a configuration (CFG) button on the network controller or the new device.

The new device is thus configured automatically, without the need for manual input of any network configuration parameters, and is now able to associate with the LAN in a secure manner as a new network member. The shared network security key, which has been transmitted with encryption and only within the LAN, and which now resides only in member devices, is used by the new device, thereby insuring that all future network transmissions are secure. Once the new member has the shared network security key and is in secure communication with the network, the cipher key is no longer needed and can be erased from memory in the member devices.

Figure 2:
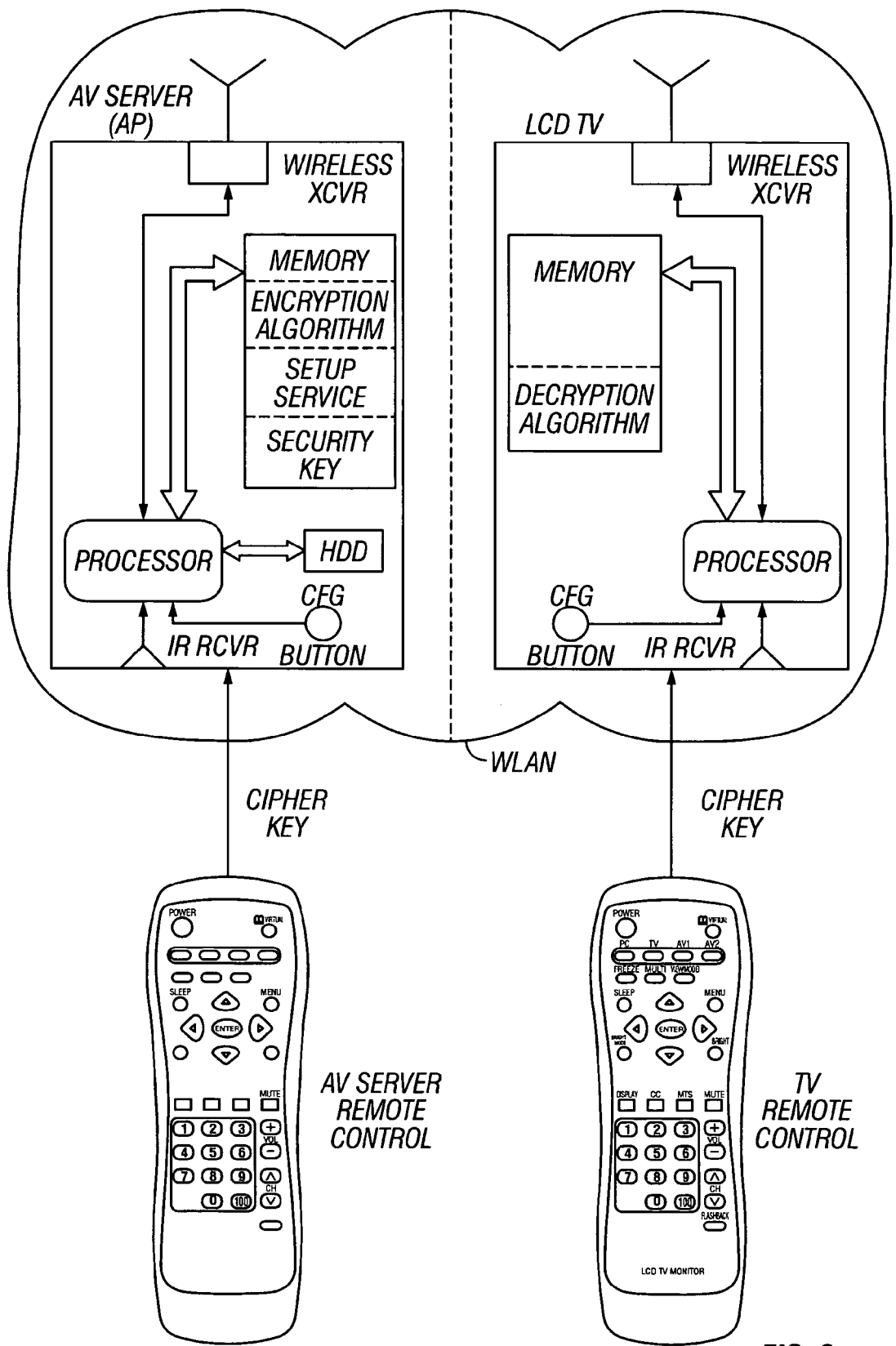
FIG. 2 is a block diagram of an IEEE 802.11 compliant WLAN according to the present invention showing the network devices and a conventional remote control for transmitting a cipher key to the network devices via infrared (IR).

FIG. 2 is a high-level block diagram of an IEEE 802.11 compliant WLAN according to the present invention and will be used to describe the method for configuring a new device. The WLAN will be described by way of example as a home network for transfer of audio and/or video content between CE devices. The WLAN thus includes an audio and/or video (audio-video or AV) server as the AP or member device with the setup service stored in memory, and a liquid-crystal display (LCD) digital TV as the nonmember device. The AV server may by a PC, DVR or similar device with a hard disk drive (HDD) for storing the audio and/or video content, or a satellite TV or cable TV set-top converter. Only two devices are shown in FIG. 2, but the WLAN may include additional member devices, such as additional TVs and a stereo receiver for playing audio content. These additional member devices would already be configured and would thus be in secure communication on the network with the AV server.

Each of the network devices includes an IEEE 802.11 wireless transceiver for network communication, an IR receiver or transceiver with encoder and/or decoder for encoding and/or decoding the RC commands, a processor (e.g., a microprocessor or microcontroller), memory accessible to the processor, and an encryption/decryption computer program stored in memory. The IEEE 802.11 wireless transceiver and IR receivers or transceivers are conventional commercially-available components used in CE devices.

The encryption/decryption computer program may implement any well-known publicly-available encryption/decryption symmetric-key algorithm that uses a secret single cipher key to encrypt and decrypt a data stream. Symmetric-key algorithms are a class of algorithms for cryptography that use trivially-related cryptographic keys for both decryption and encryption. The encryption key is trivially related to the decryption key, in that they may be identical or there is a simple transform to go between the two keys. Symmetric-key algorithms include stream ciphers that encrypt the bits of the message one at a time, and block ciphers that take fixed-length groups of bits, termed blocks, and encrypts them as single units. The publicly-available National Institute of Standards and Technology (NIST) advanced encryption standard (AES) algorithm is a symmetric-key block cipher algorithm. Examples of symmetric-key algorithms usable with the invention include well-known publicly-available algorithms, such as the Blowfish algorithm that uses a 32-bit cipher key, the CAST-128 algorithm that uses a 40-bit encryption key, and the Data Encryption Standard (DES) algorithm that uses a 56-bit cipher key.

FIG. 2 also illustrates two conventional RCs like those shipped with the TV and the AV server. The RCs are not network devices but transmit information out-of-band to the network devices via IR. Each RC includes a conventional IR transmitter and a button pad with number buttons, typically on a number-pad, and special buttons. Each button represents a command that is encoded as a series of bits, typically 7 bits, and transmitted by IR. The following Table 1 is one example of a typical RC command protocol.

TABLE 1

| RC Button | Digital code transmitted (decimal) binary |
|---|---|
| 1 | (0) 000 0000 |
| 2 | (1) 000 0001 |
| 3 | (2) 000 0010 |
| 4 | (3) 000 0011 |
| 5 | (4) 000 0100 |
| 6 | (5) 000 0101 |
| 7 | (6) 000 0110 |
| 8 | (7) 000 0111 |

TABLE 1-continued

| RC Button | Digital code transmitted (decimal) binary |
|---|---|
| 9 | (8) 000 1000 |
| 0 | (9) 000 1001 |
| Enter | (11) 000 1011 |
| Channel up | (16) 001 0000 |
| Channel down | (17) 001 0001 |
| Volume up | (18) 001 0010 |
| Volume down | (19) 001 0011 |
| Power on | (21) 001 0101 |
| Power off | (47) 010 1111 |
| Mute | (20) 001 0100 |

Figure 3:
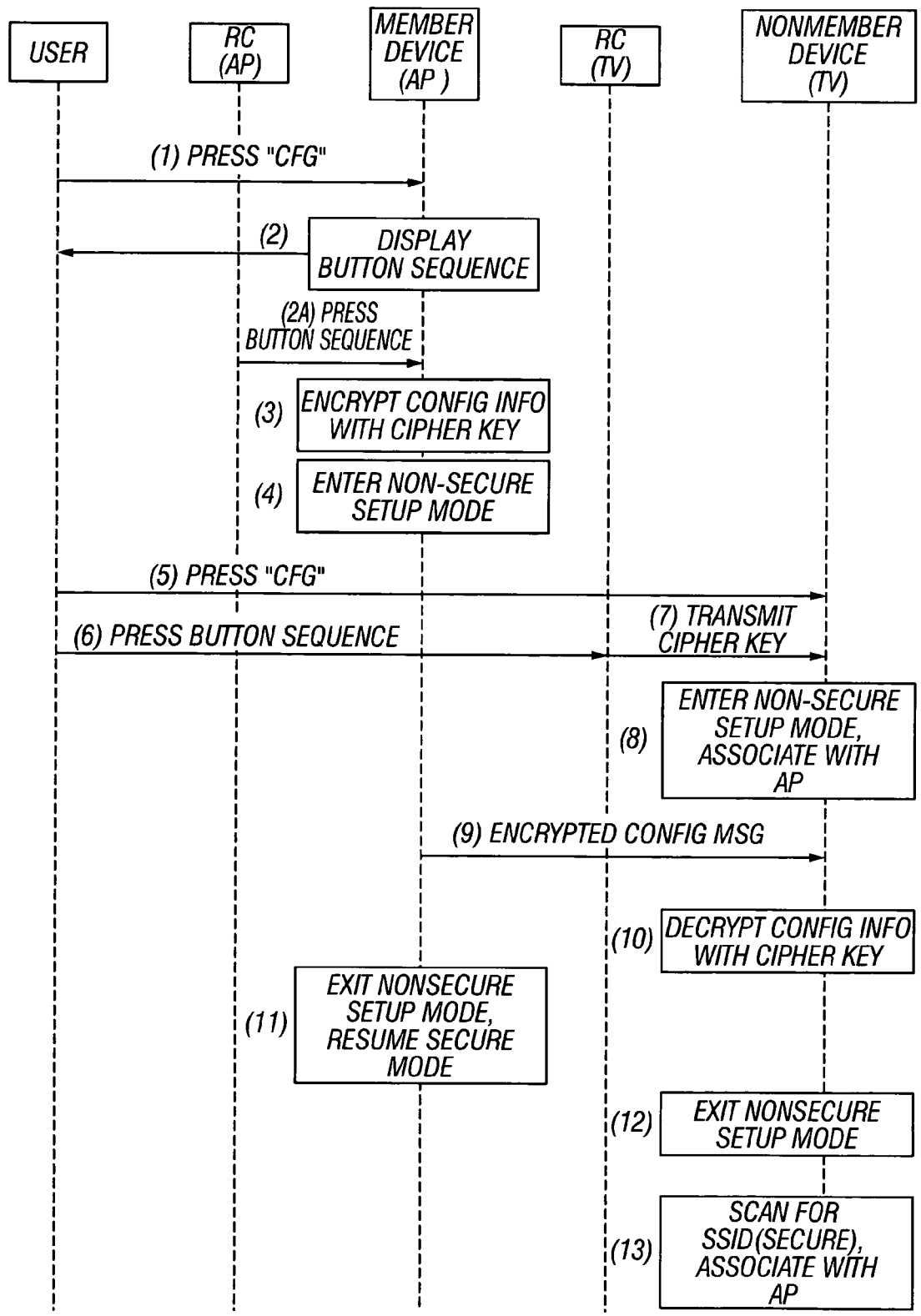
FIG. 3 is a message sequence chart illustrating a first technique for network configuration or setup of a TV (the nonmember device) in an IEEE 802.11 compliant WLAN that has an AV-server as an existing member device that also contains the setup service.

FIG. 3 is a message sequence chart illustrating a first technique for network configuration or setup of a TV (the non-member device) in an IEEE 802.11 compliant WLAN that has an AV-server as an existing member device that also contains the setup service. First, the user presses the CFG button (1) on the AV server (the AP or member device containing the setup service). This starts the setup application in the AP. The button-sequence representing the pre-established or AP-generated cipher key is displayed to the user (2), either on a small LED panel or other display connected to the AP, such as another TV. The AP uses the cipher key to encrypt the secure mode network configure information, including the SSID (SECURE), channel number, and the shared network security key (WEP key or WPA key), and has the encrypted configuration message ready for transmission (3). The AP also enters the non-secure or "open" setup-up mode (4), which means it will use a different SSID (SETUP) and channel number and no security key.

The user then presses the CFG button on the TV (5) to start the setup application in the TV. The user then presses the button-sequence on the TV's RC (6), which transmits the cipher key to the TV (7). The digital code corresponding to the button-sequence is received by the TV's IR transceiver and used to form the same cipher key that is stored in or generated by the AP. The pressing of the CFG button on the TV (5) causes the TV to enter the open setup-mode to scan for the non-secure configuration information and associate with the AP (8). After this step, the TV can communicate with the AP, but in a non-secure manner because it does not have the shared network security key.

The AP transmits the configuration information, encrypted with use of the cipher key (9), and the TV receives the encrypted configuration information and recalls the previously-stored cipher key, using it as the decryption key to decrypt the configuration information (10). The TV stores the decrypted secure-mode configuration information, i.e., the SSID(SECURE), channel number, and shared network security key (the WEP key or WPA key) in nonvolatile memory. The AP then exits setup-mode and resumes secure mode (11) in which it uses the SSID(SECURE) and the shared network security key. The TV exits the setup-mode and scans for the SSID(SECURE) (12). The TV then associates with the AP and joins the network (13) using the secure configuration information it received in step (10).

In a second technique, there is no pre-established cipher key stored in the AP and thus no pre-established button-sequence to be displayed by the AP. So instead of step (2) in FIG. 3, the AP requests the cipher key and the user presses an arbitrary button-sequence on the AP's RC to transmit the cipher key to the AP via IR. If the AP does not have an IR receiver, the cipher key can be input by use of a keypad or keyboard connected to the AP. In either method of entry, the button-sequence is transmitted to the AP out-of-band. The technique then proceeds as described above and shown in steps (3) to (13) of FIG. 3.

The cipher key has a bit length to match the encryption key bit-size used by the encryption/decryption program in the network devices. For example, if the button-sequence is a six-digit number, then a digital code of 42 bits (a six-button sequence, with each button being a 7-bit command) would be IR transmitted by the RC. In one approach, those 42 bits, or a fixed number of those bits, could function as the cipher key. Then the encryption/decryption program would support an encryption key-size of 42 or fewer bits. If the encryption/decryption program supports a 40-bit key-size, for example, then the first or last 40 bits could be identified by the encryption/decryption program as the cipher key. In another approach, the digital code corresponding to the button-sequence may be considered as a "password" that is used to generate the cipher key. The cipher key could be generated from the password by use of a look-up table, or by a simple algorithm that converts the digital code to the cipher key. This approach allows a much shorter button-sequence to be used. For example, if a three-button sequence (21 bits) is used as the password and the DES encryption/decryption program with a 56-bit cipher key is used, then the 21-bit code can be replicated to 42 bits and a predetermined string of 14 bits appended to it to generate the 56-bit cipher key. In either approach, the pressing of the button-sequence results in the transmission of the cipher key via IR and the storage of the cipher key. Whatever approach is used to obtain the cipher key from the button-sequence, it must result in the same cipher key that is stored in the AP and the TV.

For an IEEE 802.11 compliant WLAN, in addition to the shared network security key (WEP key or WPA key), the network configuration parameters would also include the secure network name SSID(SECURE), the wireless channel number, and the wireless mode (e.g., 802.11b, 802.11g). Additional parameters may include the Internet Protocol (IP) address, the Default Gateway, the sub-network mask, and authentication keys used by applications such as DTCP/IP.

In the technique described above, step (1) can occur by the user pressing a designated setup button on the AP's RC instead of pressing a configuration (CFG) button on the AP, and step (4) can occur by the user pressing a designated setup button on the TV's RC instead of pressing a configuration (CFG) button on the TV. The designated setup button that functions as the CFG button can be any button on the RC, such as "Volume Up" or "Mute", that serves as a start-setup command.

The present invention thus enables secure automatic setup of a network device is accomplished with a conventional remote control. Only a relatively short sequence of numbers is required for the cipher key, or a password representing the cipher key, and in both techniques these numbers are short enough to be easy to remember. In the technique where the button-sequence is selected by the user it can be any easy-to-remember sequence, such as birth or anniversary date, zip code, or phone number. Since the cipher key is transmitted only via IR and not over the network, not stored in the RCs, and used only once for each new device, security of the cipher key can not be easily compromised.

While the present invention has been particularly shown and described with reference to the preferred embodiments, it will be understood by those skilled in the art that various changes in form and detail may be made without departing from the spirit and scope of the invention. Accordingly, the disclosed invention is to be considered merely as illustrative and limited in scope only as specified in the appended claims.

What is claimed is:

1. A system for transmitting an encrypted LAN configuration message within a local area network (LAN) to a device to enable the device to transmit and receive encrypted communications within the LAN, the system comprising:
   a first infrared (IR) remote control having a button-pad configured to enable a user to generate an arbitrary button-sequence to thereby transmit a digital code corresponding to said arbitrary button-sequence via IR outside the LAN;
   a LAN comprising:
   a LAN member device comprising a first processor, first memory coupled to the processor, a shared LAN security key stored in the first memory configured to insure all transmissions within the LAN are encrypted, and a first computer program configured to encrypt, using a cipher key, a LAN configuration message transmitted within the LAN, wherein the encrypted LAN configuration message includes said shared LAN security key; and
   a nonmember device associated with the LAN for unencrypted communication prior to transmission of the encrypted configuration message including said shared LAN security key by the member device, the nonmember device comprising an IR receiver configured to receive said digital code from said first IR remote control outside the LAN, a second processor configured to generate said cipher key from said digital code, second memory coupled to the second processor configured to store said cipher key, and a second computer program responsive to said cipher key configured to decrypt the encrypted LAN configuration message including said shared LAN security key transmitted within the LAN by the member device; and
   a second IR remote control having a button-pad for enabling the user to generate the same button-sequence as generated at the first IR remote control to thereby transmit the same digital code via IR outside the LAN as transmitted by the first IR remote control, wherein the LAN member device includes an IR receiver configured to receive said digital code from said second IR remote control via IR outside the LAN, and wherein said first processor in the LAN member device generates the same cipher key from said digital code as generated by the nonmember device.

2. The system of claim 1 wherein the button pad on the first IR remote control includes a button for causing a start-setup command to be transmitted via IR outside the LAN to the nonmember device.

3. The system of claim 1 wherein the LAN is a powerline communications (PLC) network.

4. The system of claim 1 wherein the LAN is a wireless local area network (WLAN), wherein the member device and the nonmember device each includes a wireless transceiver, wherein the encrypted network configuration message including said shared network security key is broadcast within the WLAN by the member device, and wherein said shared network security key is selected from a Wired Equivalent Privacy (WEP) key and a Wi-Fi Protected Access (WPA) key.

5. The system of claim 1 wherein the cipher key is stored in the first memory of the LAN member device and wherein the first computer program includes instructions for deleting the cipher key from the first memory after the LAN configuration message has been encrypted.

6. The system of claim 1 wherein the cipher key is stored in the second memory of the nonmember device and wherein the second computer program includes instructions for deleting the cipher key from the second memory after the LAN configuration message has been decrypted.

7. A method for setting up an electronic device on a local area network (LAN) that has a network member device containing network setup parameters including a shared network security key, the method comprising:
   readying the electronic device, via unencrypted network transmission, for receipt of encrypted network setup parameters including a shared network security key to be used for all subsequent encrypted network transmission;
   pressing an arbitrary sequence of buttons on a first infrared (IR) remote control to thereby transmit a digital code corresponding to said arbitrary sequence of buttons to the electronic device via infrared (IR) transmission outside the network;
   generating in the electronic device a cipher key from the digital code;
   storing the cipher key in the electronic device;
   pressing the same sequence of buttons on a second infrared (IR) remote as on the first IR remote control to thereby transmit said same digital code to the network member device via infrared (IR) transmission outside the network;
   generating in the network member device the same cipher key from said same digital code as generated in the electronic device;
   encrypting the network setup parameters including said shared network security key in the network member device using said same cipher key as the encryption key;
   transmitting within the network from the network member device the encrypted network setup parameters including said shared network security key;
   receiving in the electronic device the encrypted network setup parameters, including the shared network security key, via transmission within the network;
   decrypting the encrypted network setup parameters, including the shared network security key, in the electronic device using the stored cipher key; and
   thereafter using the decrypted shared network security key in the electronic device for encrypted transmission within the network without use of the stored cipher key.

8. The method of claim 7 wherein the LAN is a wireless local area network (WLAN).

9. The method of claim 7 further comprising, prior to transmitting said digital code to the electronic device, transmitting a start-setup command from the first IR remote control to the electronic device via infrared (IR) transmission outside the network.

* * * * *